(12) United States Patent
Lee et al.

(10) Patent No.: US 10,082,631 B2
(45) Date of Patent: Sep. 25, 2018

(54) CONNECTING DEVICE AND CONNECTING DEVICE FOR ROBOT MANIPULATOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Te-Hua Lee, New Taipei (TW); Ming-Chieh Chang, New Taipei (TW); Yong-Xin Wang, Shenzhen (CN)

(73) Assignees: HONG FU JIN PRECISION INDUSTRY (ShenZhen), Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 481 days.

(21) Appl. No.: 14/718,710

(22) Filed: May 21, 2015

(65) Prior Publication Data

US 2016/0062046 A1 Mar. 3, 2016

(30) Foreign Application Priority Data

Aug. 29, 2014 (CN) .......................... 2014 1 0433809

(51) Int. Cl.
*G02B 6/38* (2006.01)
*B25J 15/04* (2006.01)
*B25J 19/00* (2006.01)

(52) U.S. Cl.
CPC ........ *G02B 6/3817* (2013.01); *B25J 15/0441* (2013.01); *B25J 15/0458* (2013.01); *B25J 19/0033* (2013.01)

(58) Field of Classification Search
CPC B25J 15/0441; B25J 15/0458; B25J 15/0608; G02B 6/3817
USPC ......... 74/490.02; 439/38, 39, 40; 901/40, 41
See application file for complete search history.

(56) References Cited

U.S. PATENT DOCUMENTS

| 4,488,241 | A | * | 12/1984 | Hutchins | ................ | B25J 9/1612 |
| | | | | | | 279/900 |
| 4,844,582 | A | * | 7/1989 | Giannini | .............. | G02B 6/3817 |
| | | | | | | 385/57 |
| 5,348,491 | A | * | 9/1994 | Louwagie | ............ | G02B 6/3817 |
| | | | | | | 200/51.09 |

(Continued)

*Primary Examiner* — William Kelleher
*Assistant Examiner* — Bobby Rushing, Jr.
(74) *Attorney, Agent, or Firm* — ScienBiziP, P.C.

(57) ABSTRACT

A connecting device configured to couple to a robot arm and a robot tool includes a first connecting part including a fixing member having at least one first magnetic part, at least one first optical fiber connector, and at least one first electrical connector which are coupled to the fixing member. A second connecting part which is removable and securely coupled to the first connecting part including a fixing member having at least one second magnetic part, at least one second optical fiber connector, and at least one first conduction connector which are coupled to the fixing member. The first magnetic part and the second magnetic part have opposite magnetic force. When the first magnetic part contacts the second magnetic part, the first optical fiber connector connect to the second optical fiber connector and the first electrical connector connects to the first conduction connector.

17 Claims, 5 Drawing Sheets

(56) References Cited

U.S. PATENT DOCUMENTS

| | | | | |
|---|---|---|---|---|
| 5,614,808 | A * | 3/1997 | Konoya | B60L 11/1818 320/109 |
| 8,550,859 | B2 * | 10/2013 | Van Swearingen | H01R 13/514 439/660 |
| 9,493,087 | B2 * | 11/2016 | Leary | B60L 11/1824 |
| 2012/0207538 | A1 * | 8/2012 | Rizk | B25J 15/04 403/315 |
| 2014/0120746 | A1 * | 5/2014 | Persion | G02B 6/3817 439/39 |
| 2015/0055914 | A1 * | 2/2015 | Dell'Anno | G02B 6/3816 385/28 |
| 2015/0202009 | A1 * | 7/2015 | Nussbaumer | A61B 19/081 128/856 |

\* cited by examiner

CONNECTING DEVICE AND CONNECTING DEVICE FOR ROBOT MANIPULATOR

FIELD

The subject matter herein generally relates to a connecting device for a robot manipulator.

BACKGROUND

The robot arm is usually coupled to the robot tool through screws. This kind of assembly method may cause inconvenience to users when assembling and dissembling the robot arm and the robot tool, especially assembling and dissembling the conduction wires inside/outside the robot arm and the robot tool.

BRIEF DESCRIPTION OF THE DRAWINGS

Implementations of the present technology will now be described, by way of example only, with reference to the attached figures.

DETAILED DESCRIPTION

Figure 1:
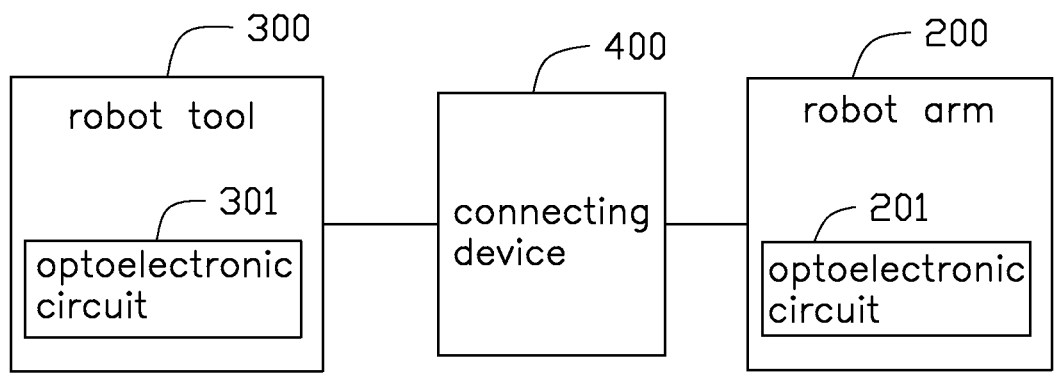
FIG. 1 is a block diagram of a robot manipulator.
Figure 2:
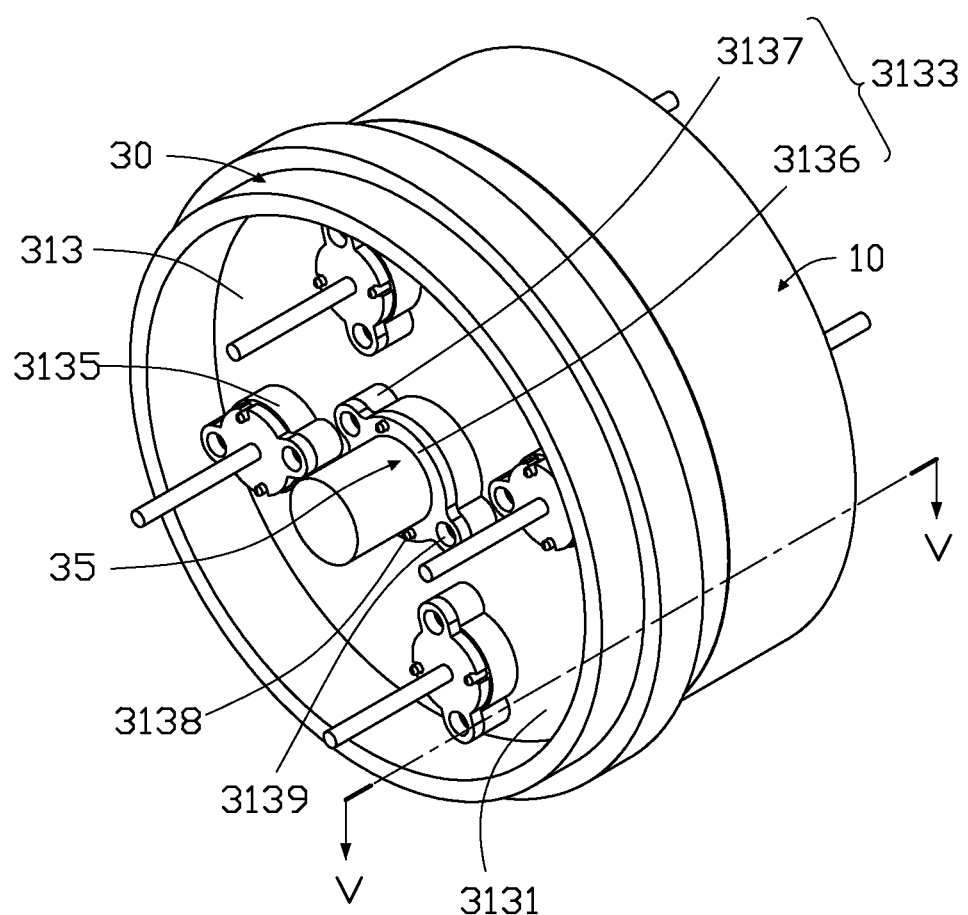
FIG. 2 is an isometric view of a connecting device of the robot manipulator of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is in relation to a connecting device for a robot arm to be assembled or dismantled with a robot tool and a robot manipulator using the connecting device.

FIG. 1 illustrates an embodiment of a robot manipulator 100 comprising a robot arm 200, a robot tool 300 is removable and securely coupled to the robot arm 200, and a connecting device 400 configured to couple to the robot arm 200 and the robot tool 300. The connecting device 400 comprises a first connecting part 10 which is removable and securely coupled to the robot arm 200 and a second connecting part 30 which is removable and securely coupled to the robot tool 300. The second connecting part 30 is removable and securely coupled to the first connecting part 10 so that the robot tool 300 can be removable and securely coupled to the robot arm 200.

FIG. 2 to FIG. 5 illustrate the first connecting part 10 comprises a fixing member 11, four of first magnetic parts 13 secured on the fixing member 11, a first optical fiber connector 15, two of first electrical connectors 16 and two of second electrical connectors 17. In this embodiment, the robot arm 200 comprises an optoelectronic circuit 201, coupled to the two of first electrical connectors 16 and two of second electrical connectors 17. The optoelectronic circuit 201 is configured to transform an electrical signal to an optical signal and can prevent an electromagnetic interference by using the first optical fiber connector 15 to transfer the optical signal. In some other embodiments, the optoelectronic circuit 201 is also configured to transfer the optical signal to the electrical signal when receiving the optical signal from the first optical fiber connector 15.

Figure 4:
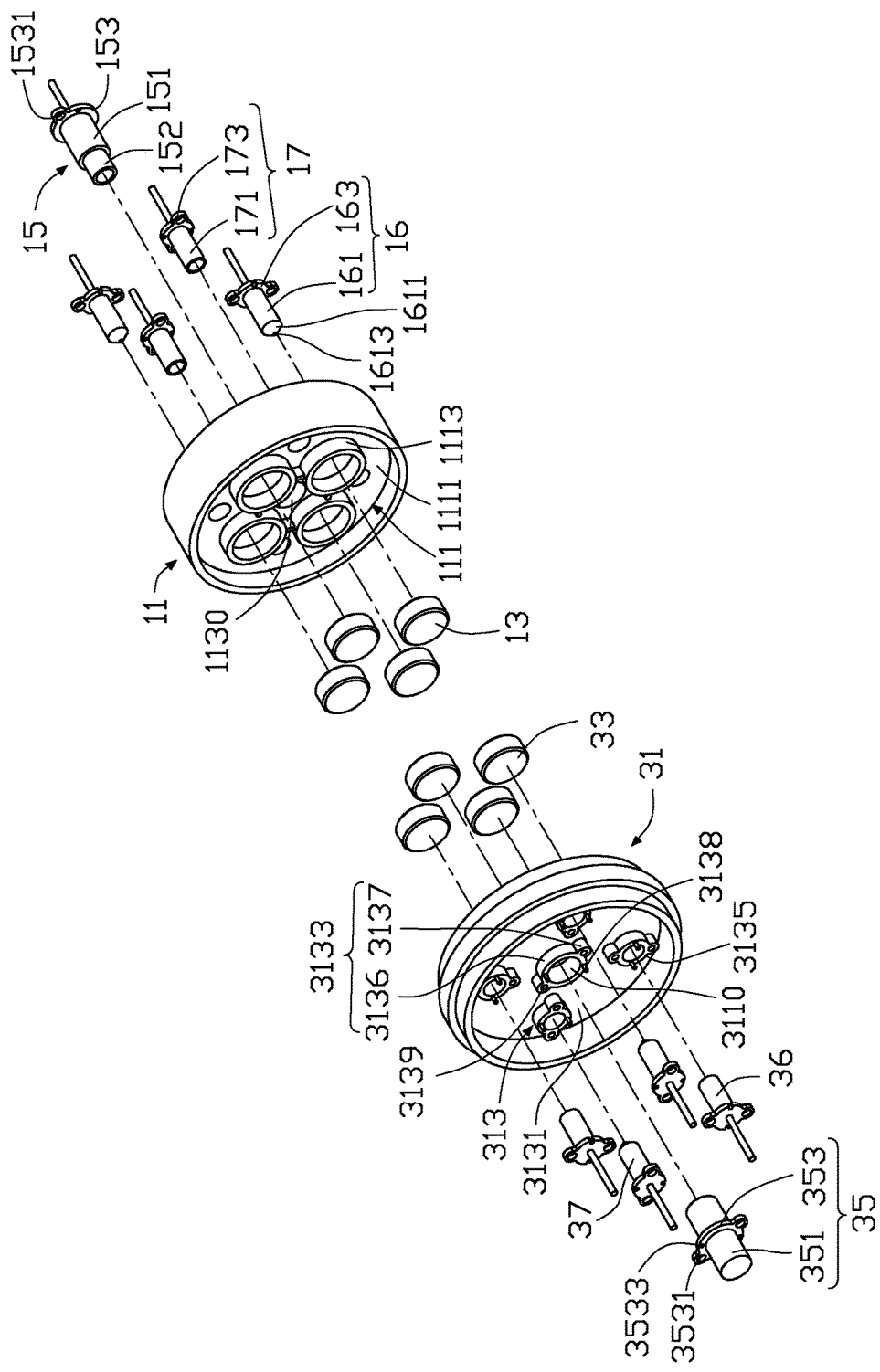
FIG. 4 is another exploded isometric view of the connecting device of FIG. 2.
Figure 5:
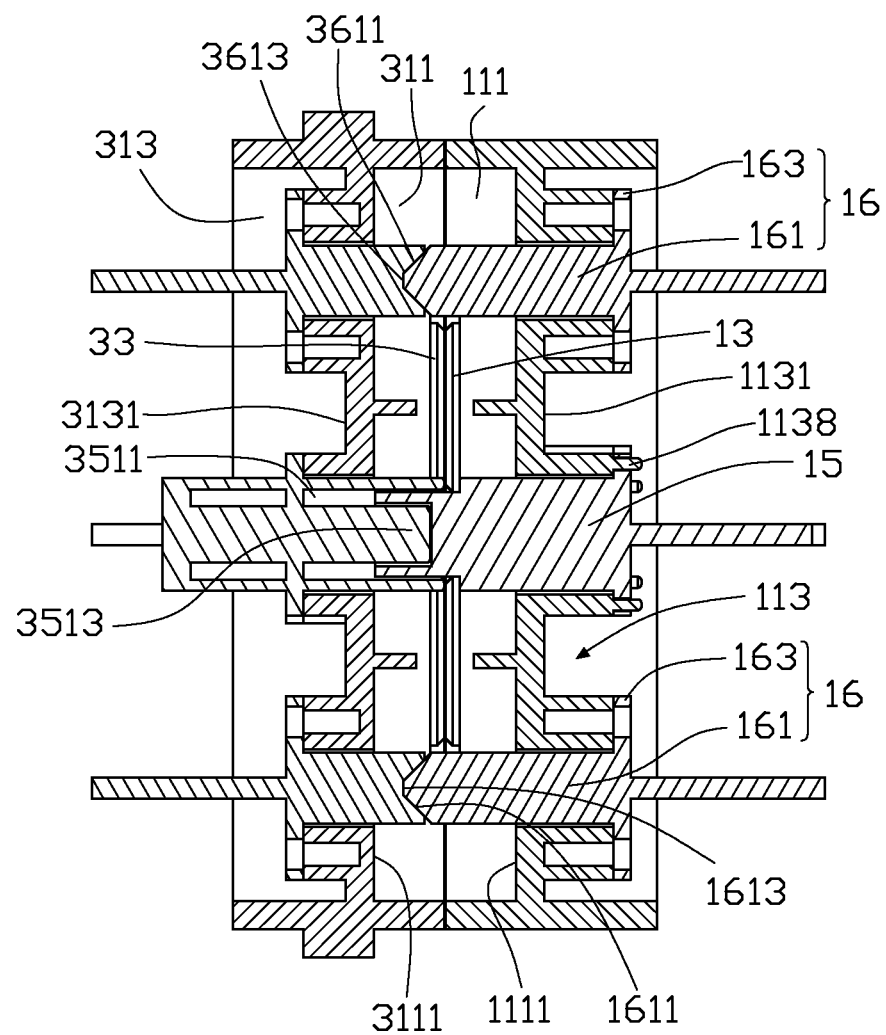
FIG. 5 illustrates a cross sectional view of the connecting device of FIG. 2.

FIG. 4 and FIG. 5 illustrate the fixing member 11 is in round shape. The two sides of the fixing member 11 define a groove 111 and an opposite groove 113. The groove 111 and the groove 113 have the same base. The groove 111 is close to the second connecting part 30. The fixing member 11 comprises a fixing surface 1111 in the groove 111. The fixing surface 1111 has four of receiving portions 1113 constructed perpendicularly to the second connecting part 30 which is hollow and round. The centers of the four of receiving portions 1113 are separately located in four corners of a virtual rectangle, wherein the center axis of the virtual rectangle matches the center axis of the fixing member 11. The four of first magnetic parts 13 are separately received by the four of receiving portions 1113. One side of the first magnetic part 13 is mounted on the side of the fixing surface 1111 with glue, and another side of the first magnetic part 13 is protruded from the receiving portion 1113.

Figure 3:
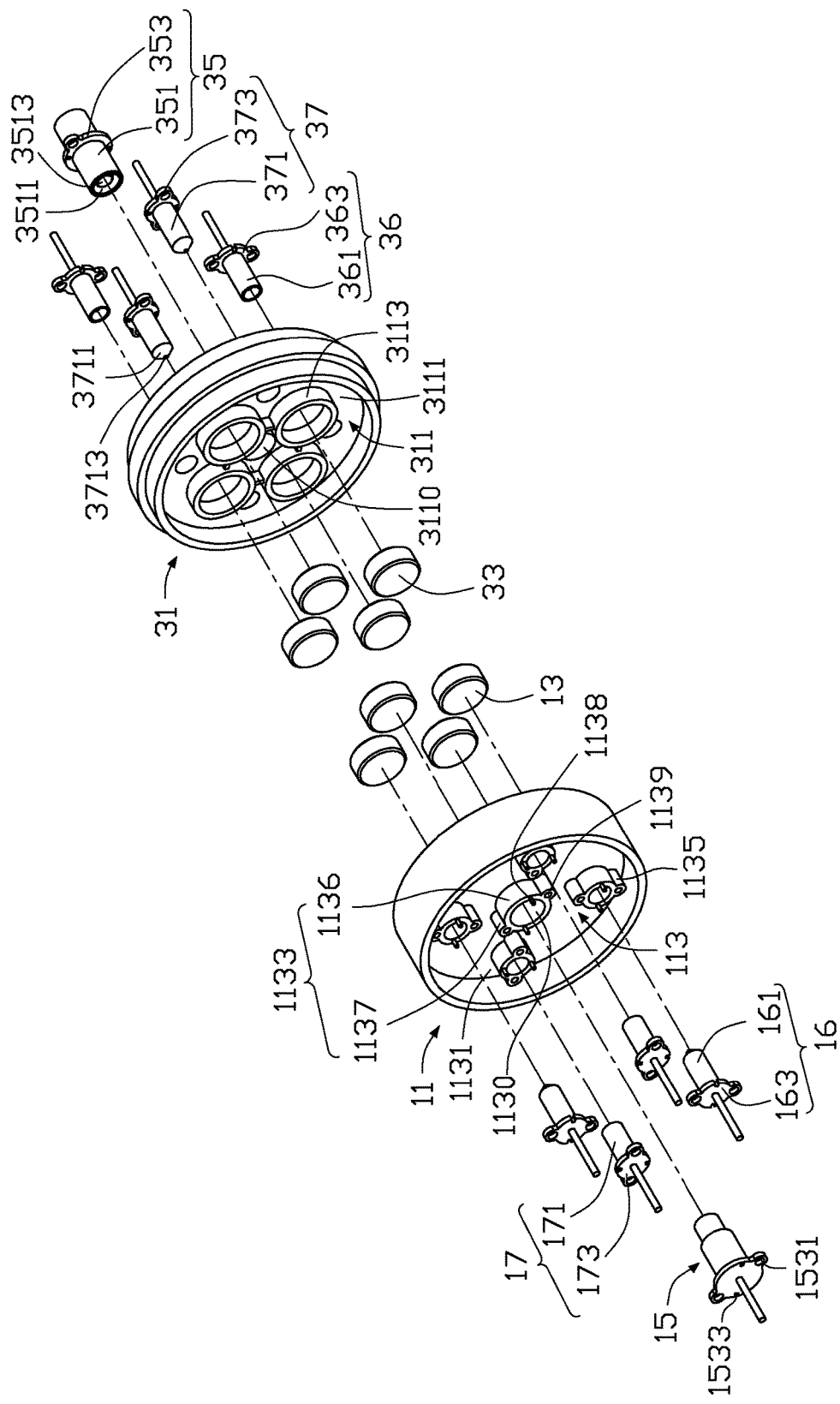
FIG. 3 is an exploded isometric view of the connecting device of FIG. 2.

FIG. 3 and FIG. 4 illustrate the fixing member 11 further comprises a fixing surface 1131 in the groove 113. The fixing surface 1131 has a first container 1133 and four second containers 1135 protruding away from the fixing surface 1131 in the perpendicular direction. The axis of the first container 1133 matches the axis of the fixing member 11. The second containers 1135 are located at the perpendicular bisector of a line segment between two neighboring receiving portions 1113. The center of the four second containers 1135 is located at four corners of a virtual rectangle. The center axis of the virtual rectangle matches the axis of the fixing member 11. The first container 1133 and the four second containers 1135 have the same structure. Take the first container 1133 as an example, the first container 1133 is substantially cylindrical shape. The first container 1133 comprises a main body 1136 and two tabs 1137 at opposite positions extending from the fringe of the main body 1136. The main body 1136 is cylindrical shape and has a hole 1130 along the axis direction. The hole 1130 passes through fixing surface 1111 and fixing surface 1131. The main body 1136 has two bulges 1138 in the direction away from the fixing surface 1131. The two tabs 1137 is cylindrical shape. The tabs 1137 define an installation hole 1139 along the axis.

FIG. 3 and FIG. 4 illustrate the first fiber connector 15 is set in the hole 1130 of the first container 1133. The first fiber connector 15 comprises a main body 151 of the first fiber connector 15. The main body 151 has a first bulge 152 and a first fixing part 153 located in opposite position which are both protruding from the main body 151. The first fixing part 153 is coupled to the first container 1133. The first bulge 152 is received by the groove 111. The first fixing part 153 is received by the groove 113. The main body 151 of the first fiber connector 15 has a fiber core (not shown) embedded inside the main body 151. The first bulge 152 is hollow and in cylindrical shape. The shape of the first fixing part 153 is similar to the first container 1133. The first fixing part 153 has two assembly holes 1531. The two assembly holes 1531 of the first fixing part 153 are coupled to two installation holes 1139 of the first container 1133. The fringe of the first fixing part 153 has two positioning holes 1533 coupled to two bulges 1138 on the first container 1133. The two bulges 1138 are configured to be coupled to the related positioning holes 1533. The two assembly holes 1531 of the first fixing part 153 and the two installation holes 1139 of the first container 1133 are fixed by screws so that the first fiber connector 15 can be fixed on the first container 1133.

Two of the first electrical connectors 16 are coupled to the corresponding second containers 1135. The first electrical connector 16 comprises a main body 161 of the first electrical connector 16 and a second fixing part 163 protruding from the main body 161 of the first electrical connector 16 which is coupled to the corresponding second container 1135. The main body 161 of the first electrical connector 16 has a conduction line (not shown) embedded inside the main body 161 of the first electrical connector 16. The end of the main body 161 of the first electrical connector 16 close to the second connecting part 30 has a cone-shape structure 1611. The end of the cone-shape structure 1611 has a metal contact 1613. The second connecting part 30 is received in the groove 113. The second fixing part 163 has similar shape as the second container 1135. The second fixing part 163 has two assembly holes 1631. The two assembly holes 1631 of the second fixing part 163 are coupled to the two installation holes 1139 of the second container 1135. The fringe of the second fixing part 163 has two positioning holes 1633 coupled to two bulges 1138 on the second container 1135. The two bulges 1138 are configured to be coupled to the related positioning holes 1633. The two assembly holes 1631 of the second fixing part 163 and the two installation holes 1139 of the second container 1135 are fixed by screws so that the first electrical connector 16 can be fixed on the second container 1135.

FIG. 3 and FIG. 4 illustrate two of the second electrical connectors 17 are coupled to the corresponding second containers 1135. The second electrical connector 17 comprises a main body 171 of the second electrical connector 17 and a second fixing part 173 protruding from the main body 171 of the second electrical connector 17 which is coupled to the corresponding second container 1135. The main body 171 of the second electrical connector 17 has a conduction line (not shown) embedded inside the main body 171 of the second electrical connector 17. The end of the main body 171 of the second electrical connector 17 close to the second connecting part 30 defines a groove-shape structure 1711. The end of the groove-shape structure 1711 has a metal contact 1713. The second fixing part 173 of the second electrical connector 17 has the same structure as the second fixing part 163 of the first electrical connector 16.

The second connecting part 30 has a similar structure as the first connecting part 10. The second connecting part 30 comprises a fixing member 31, four second magnetic parts 33, a second fiber connector 35, two first conduction connectors 36 and two second conduction connectors 37. In the embodiment, the robot tool 300 comprises an optoelectronic circuit 301 electrically coupled to the second fiber connector 35. The optoelectronic circuit 301 is configured to process optical signals transmitted from the second fiber connector 35 and transform the optical signals to be electrical signals. In some embodiments, the optoelectronic circuit 301 is configured to process electrical signals transmitted from the first conduction connector 36 or two second conduction connectors 37 and transform the electrical signals to be optical signals.

FIG. 5 illustrates the second magnetic part 33 has opposite magnetic force to the first magnetic part 13. The two sides of the fixing member 31 define a first groove 311 and a second groove 313 set at the opposite position of the groove 311. The first groove 311 and the second groove 313 have the same base. The first groove 311 is close to the first connecting part 10. The fixing member 31 comprises a fixing surface 3111 received by the first groove 311. The fixing surface comprises four receiving portions 3113 which perpendicularly face to the first connecting part 10. The four receiving portions 3113 are hollow and round. The center of the four receiving portions 3113 is separately located in four corners of a virtual rectangular, wherein the center axis of the virtual rectangle matches the center axis of the fixing member 11. The four second magnetic parts 33 are separately received by the four receiving portions 3113. One side of the second magnetic part 33 is mounted on the side of the fixing surface 3111 with glue, and another side of the second magnetic part 33 is protruding from the receiving portion 3113.

FIG. 4 illustrates the fixing member 31 further comprises a fixing surface 3131 in the groove 313. The fixing surface 3131 has a first container 3133 and four second containers 3135 protruding perpendicularly away from the fixing surface 3131. The axis of the first container 3133 matches the axis of the fixing member 31. The second containers 3135 are located at the perpendicular bisector of a line segment between two neighboring receiving portions 3113. The center of the four of the second containers 3135 is located at four corners of a virtual rectangle. The center axis of the virtual rectangle matches the axis of the fixing member 31. The first container 3133 and the four second containers 3135 have the same structure. Take the first container 3133 as an example, the first container 3133 is substantially cylindrical shape. The first container 3133 comprises a main body 3136 and two tabs 3137 at opposite positions extending from the fringe of the main body 3136. The main body 3136 is cylindrical shape and has a hole 3110 along the axis. The hole 3110 passes through fixing surface 3111 and fixing surface 3113. The main body 3136 has two bulges 3138 in the direction away from the fixing surface 3113. The two tabs 3137 are cylindrical shape. The tab 3137 defines setting installation 3139 along the axis.

FIG. 3 and FIG. 4 illustrate the second fiber connector 35 is set in the hole 3110 of the first container 3133. The second fiber connector 35 comprises a main body 351 of the second fiber connector 35. The main body 351 has a first fixing part 353 protruding from the main body 351. The first fixing part 353 is coupled to the first container 3133. The first fixing part 353 is received by the groove 313. The main body 351 of the second fiber connector 35 has a fiber core (not shown) embedded inside the main body 351. The main body 351 has a round groove 3511. A second bulge 3513 is received by the groove 3511. The center axis of the second bulge matches the center axis of the first bulge 152. The first bulge 152 is coupled to the second bulge 3513 and is received by the groove 3511. The second bulge 3513 touches the end surface of the first bulge 152 so that the second fiber connector 35 can be coupled to the first fiber connector 15. The shape of the first fixing part 353 is similar with the first container 3133. The first fixing part 353 has two assembly holes 3531. The two assembly holes 3531 of the first fixing part 353 are coupled to the two installation holes 3139 of the first container 3133. The fringe of the first fixing part 353 has two positioning holes 3533 coupled to two bulges 3138 on the first container 3133. The two bulges 3138 are configured to be coupled to the related positioning holes 3533. The two assembly holes 3531 of the first fixing part 3533 and the two installation holes 3139 of the first container 3133 are fixed by screws so that the second fiber connector 35 can be fixed on the first container 3133.

FIG. 3 and FIG. 4 illustrate the first conduction connector 36 has the same structure as the first electrical connectors 16. The second conduction connector 37 has the same structure as the second electrical connectors 17. Two of the first conduction connectors 36 are coupled to the corresponding second containers 3135. The first conduction connector 36 comprises a main body 361 of the first conduction connector 36 and a second fixing part 363 protruding from the main body 361 of the first conduction connector 36 which is coupled to the corresponding second container 3135. The main body 361 of the first conduction connector 36 has a conduction line (not shown) embedded inside the main body 361 of the first conduction connector 36. The end of the main body 361 of the first conduction connector 36 close to the first connecting part 10 has a surface 3611 touching the cone-shape structure 1611. The surface 3611 has a metal contact 3613. The second fixing part 363 of the first conduction connector 36 and the second fixing part 163 of the first electrical connector 16 have the same structure.

Two of the second conduction connectors 37 are coupled to the corresponding second containers 3135. The second conduction connector 37 comprises a main body 371 of the second conduction connector 37 and a second fixing part 373 protruding from the main body 371 of the first conduction connector 37 which is coupled to the corresponding second container 3135. The main body 371 of the second conduction connector 37 has a conduction line (not shown) embedded inside the main body 371 of the second conduction connector 37. The end of the main body 371 of the second conduction connector 37 close to the first connection part 10 has a cone-shape structure surface 3711. The surface 3711 has a metal contact 3713. The second fixing part 373 is received by the second groove 313. The second fixing part 373 and the second fixing part 163 have the same structure.

When in assembly, the first electrical connector 16 and the second electrical connector 17 are coupled to the corresponding second containers 1135 of the first fixing part 10 and fixed by screws. The first conduction connector 36 and the second conduction connector 37 are coupled to and through the corresponding second containers 3135 of the second fixing part 30 and fixed by screws. The first optical fiber connector 15 is coupled to the first container 1133. The first fixing part 10 is mounted on the robot arm 200. The second optical fiber connector 35 is coupled to the first container 3133 and fixed on the first container 3133 by screws. The first magnetic part 13 and the second magnetic part 33 are received by the corresponding first receiving portions 1113 and the first container 3133 and fixed on the fixing surface 1111 and the fixing surface 3111 by glue. The second fixing part 30 is mounted on the robot tool 300. The first fixing part 10 is coupled to the second fixing part 30. The first magnetic part 13 and the second magnetic part 33 are mutually attracted. The first optical fiber connector 15 is coupled to the second optical fiber connector 35 so that the end surface of the first bulge 152 touches the second bulge 3513. The first electrical connector 16 is coupled to the first conduction connector 36 so that the metal contact 1613 touches the metal contact of the first conduction connector 36. The cone-shape structure 1611 touches the metal contact 3613 of the first conduction connector 36. The second electrical connector 17 is coupled to the second conduction connectors 37 so that the metal contact 1713 touches the metal contact 3713 of the second conduction connector 37.

When the robot manipulator 100 is working, the first fixing part 10 is mounted on the robot arm 200, and the second fixing part 30 is mounted on the robot tool 300. The first fixing part 10 is coupled to the second fixing part 30 with the first magnetic part 13 and the second magnetic part 33 mutually attracted. The robot arm 200 and the robot tool 300 can be put together or disassembled depending on magnitude of magnetic force of the first magnetic part 13 and the second magnetic part 33. The metal contact 1613 touches the metal contact of the first conduction connector 36 when conducting electricity. The first optical fiber connector 15 is coupled to the second optical fiber connector 35 and the end surface of the first bulge 152 touches the second bulge 3513 when transmitting optical signals.

In this embodiment, the magnetic force of the first magnetic part 13 and the second magnetic part 33 can be set depending on the payload of the robot tool 300. When the payload of the robot tool 300 exceeds the maximum payload, the first magnetic part 13 and the second magnetic part 33 disassemble. Because the way electricity is conducted is based on the first electrical connector 16 being coupled to the first conduction connector 36 through the metal contacts, it avoids the inconvenience of assembly or disassembly when using traditional wires. Because the way electricity is conducted is based on the second electrical connector 17 coupled to the second conduction connector 37 through the metal contacts, it avoids the inconvenience of assembly or disassembly when using traditional wires. The first optical fiber connector 15 is coupled to the second optical fiber connector 35 to transmit optical signals so that electromagnetic interference is prevented. When the first magnetic part 13 and the second magnetic part 33 are disassembled, the first electrical connector 16 and first conduction connector 36 are disassembled. The robot arm 200 and the robot tool 300 can be disassembled easily when robot tool 300 has mal-functioned.

In some embodiments, the receiving portion 1113 and the receiving portion 3113 are not necessarily used in the robot manipulator 100. The first magnetic part 13 and the second magnetic part 33 can be fixed on the fixing member 11 and the fixing member 31 by glue.

In some embodiments, the receiving portion 1113 and the receiving portion 3113 are not limited to being protruded from the fixing surface 1111 and fixing surface 3111. The receiving portion 1113 and the receiving portion 3113 also can pass through the groove 113 and the groove 313. The first magnetic part 13 and the second magnetic part 33 can be fixed on the receiving portion 1113 and the receiving portion 3113 by glue.

In some embodiments, the number of the first electrical connector 16, the second electrical connector 17, the first conduction connector 36 and the second conduction connector 37 is not limited in two pieces. The number of the connectors can be set based on the different design of the robot manipulator 100.

In some embodiments, the number of the first optical fiber connector 15 and the second optical fiber connector 35 is not limited in two pieces. The number of the optical fiber connectors can be set based on the different design of the robot manipulator 100.

In some embodiments, the number of the first optical fiber connector 15 and the second optical fiber connector 35 is not limited to two. The number of the optical fiber connectors can be set based on the different design of the robot manipulator 100.

In some embodiments, the arrangement of the four receiving portions 1113 on the fixing member 11 is not limited in virtual rectangular shape. The arrangement of the four receiving portions 1113 can be linear shape or triangular shape.

In some embodiments, the arrangement of the four containers 1135 on the fixing part 13 is not limited in virtual rectangular shape. The arrangement of the four containers 1135 can be linear shape or triangular shape.

In some embodiments, the optoelectronic circuit 201 and the optoelectronic circuit 301 can be replace by an optoelectronic converter.

In some embodiments, the receiving portion 1113 and the container 3133 are not set on the center axis of the fixing member 11 and the fixing member 31. The receiving portion 1113 and the container 3133 can be set on any place of the fixing member 11 and the fixing member 31.

The embodiments shown and described above are only examples. Many details are often found in the art such as the other features of a connecting device and connecting device for robot manipulator. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A connecting device configured to couple a robot arm to a robot tool comprising:
   a first connecting part comprising a first fixing member, the first fixing member having at least one first magnetic part, at least one first optical fiber connector, and at least one first electrical connector coupled thereto; and
   a second connecting part removable and securely coupled to the first connecting part, the second connecting part comprising a second fixing member, the second fixing member having at least one second magnetic part, at least one second optical fiber connector, and at least one first conduction connector coupled thereto; and
   wherein the first magnetic part and the second magnetic part have corresponding opposite magnetic forces, and when the first magnetic part contacts the second magnetic part, the first optical fiber connector connects to the second optical fiber connector and the first electrical connector connects to the first conduction connector;
   wherein the first fixing member and the second fixing member both comprise a first container, each of the first containers comprises a main body and two tabs at opposite positions extending from a fringe of the main body; the first optical fiber connector is set in the main body of the first container of the first fixing member and coupled onto the two tabs of the first container of the first fixing member; and the second optical fiber connector is set in the main body of the first container of the second fixing member and coupled onto the two tabs of the first container of the second fixing member.

2. The connecting device of claim 1, wherein the first electrical connector and the first conduction connector both have metal contacts, and when the first electrical connector connects to the first conduction connector, the metal contact of the first electrical connector touches the metal contact of the first conduction connector.

3. The connecting device of claim 2, wherein the first electrical connector comprises a main body of the first electrical connector, an end of the main body of the first electrical connector has a cone-shape structure close to the second connecting part, the end of the main body with the cone-shape structure has the metal contact of the first electrical connector, the first conduction connector comprises a main body of the first conduction connector, an end of the main body of the first conduction connector close to the main body of the first electrical connector has a surface, the surface of the main body of the first conduction connector close to the first connecting part has the metal contact of the first conduction connector, and when the metal contact of the main body of the first electrical connector touches the metal contact of the main body of the first conduction connector, the surface of the main body of the first conduction connector touches the cone-shape structure of the first electrical connector.

4. The connecting device of claim 1, wherein the first optical fiber connector comprises a main body of the first optical fiber connector, the main body of the first optical fiber connector has a first bulge which is protruded from the main body of the first optical fiber connector, the first bulge is hollow, the second optical fiber connector comprises a main body of the second optical fiber connector, the main body of the second optical fiber connector has a round groove so that a second bulge is created, the second bulge is received by the groove, the first bulge is coupled to the second bulge and is received by the groove, and the second bulge touches the first bulge so that the second fiber connector can be coupled to the first fiber connector.

5. The connecting device of claim 1, wherein the first connecting part and second connecting part both have at least one receiving portion, and the first magnetic part and the second magnetic part are received by the corresponding receiving portions.

6. The connecting device of claim 1, wherein the first connecting part further comprises at least one second electrical connector, the second connecting part further comprises at least one second conduction connector, the second electrical connector is coupled to the second conduction connector, the second electrical connector has the same structure as the first conduction connector, and the second conduction connector has the same structure as the first electrical connector.

7. The connecting device of claim 6, wherein the first fixing member and the second fixing member both further comprise at least one second container, the main body of each first container and each of the second containers have holes passing there-through, the first optical fiber connector is set in the hole of the first container of the first fixing member, the second optical fiber connector is set in the hole of the first container of the second fixing member, the first electrical connector and the second electrical connector are set in the corresponding holes of the second containers of the first fixing member and are coupled onto the second containers of the first fixing member, and the first conduction connector and the second conduction connector are set in the corresponding holes of the second containers of the second fixing member and are coupled onto the second containers of the second fixing member.

8. The connecting device of claim 7, wherein the main body of each first container has a hole along a central axis thereof, each of the first containers further comprises two bulges extending from the corresponding main body, each of the tabs has an installation hole, the first optical fiber connector and the second optical fiber connector both comprise a first fixing part, each of the first fixing parts has assembly holes related to the installation holes and positioning holes related to the bulges, and the bulges are configured to couple to the related positioning holes.

9. A robot hand comprising:
a robot arm comprising an optoelectronic circuit electrically;
a robot tool; and
a first connecting device configured to couple the robot arm to the robot tool, the first connecting device comprising a fixing member, the fixing member having at least one first magnetic part, at least one first optical fiber connector, and at least one first electrical connector coupled thereto; and
wherein the fixing member comprises a first container, the first container comprises a main body and two tabs at opposite positions extending from a fringe of the main body, the first optical fiber connector is set in the main body and coupled onto the two tabs;
wherein the first magnetic part, the first optical fiber connector and the first electrical connector are coupled to the fixing member, the optoelectronic circuit is electrically coupled to the first optical fiber connector, and the optoelectronic circuit is configured to transform an electrical signal to an optical signal, and the first optical fiber connector is configured to transmit the optical signal.

10. A robot manipulator comprising:
a robot arm;
a robot tool removable and securely coupled to the robot arm;
a connecting device configured to couple the robot arm to the robot tool; and
wherein the connecting device comprises a first connecting part removable and securely coupled to the robot arm and a second connecting part removable and securely coupled to the robot tool, and the second connecting part is removable and securely coupled to the first connecting part so that the robot tool can be removable and securely coupled to the robot arm;
wherein the first connecting part comprises a first fixing member having at least one first magnetic part, at least one first optical fiber connector, and at least one first electrical connector coupled thereto, the second connecting part comprises a second fixing member having at least one second magnetic part, at least one second optical fiber connector, and at least one first conduction connector coupled thereto; the first magnetic part and the second magnetic part have corresponding opposite magnetic forces, and when the first magnetic part contacts the second magnetic part, the first optical fiber connector connects to the second optical fiber connector and the first electrical connector connects to the first conduction connector; and wherein the first fixing member and the second fixing member both comprise a first container, each of the first containers comprises a main body and two tabs at opposite positions extending from a fringe of the main body; the first optical fiber connector is set in the main body of the first container of the first fixing member and coupled onto the two tabs of the first container of the first fixing member; and the second optical fiber connector is set in the main body of the first container of the second fixing member and coupled onto the two tabs of the first container of the second fixing member.

11. The robot manipulator of claim 10, wherein the first electrical connector and the first conduction connector both have metal contacts, and when the first electrical connector connects to the first conduction connector, the metal contact of the first electrical connector touches the metal contact of the first conduction connector.

12. The robot manipulator of claim 11, wherein the first electrical connector comprises a main body of the first electrical connector, an end of the main body of the first electrical connector has a cone-shape structure close to the second connecting part, the end of the main body with the cone-shape structure has the metal contact of the first electrical connector, the first conduction connector comprises a main body of the first conduction connector, an end of the main body of the first conduction connector close to the main body of the first electrical connector has a surface, the surface of the main body of the first conduction connector close to the first connecting part has the metal contact of the first conduction connector, and when the metal contact of the main body of the first electrical connector touches the metal contact of the main body of the first conduction connector, the surface of the main body of the first conduction connector touches the cone-shape structure of the first electrical connector.

13. The robot manipulator of claim 10, wherein the first optical fiber connector comprises a main body of the first optical fiber connector, the main body of the first optical fiber connector has a first bulge protruded from the main body of the first optical fiber connector, the first bulge is hollow, the second optical fiber connector comprises a main body of the second optical fiber connector, the main body of the second optical fiber connector has a round groove so that a second bulge is created, the second bulge is received by the groove, the first bulge is coupled to the second bulge and is received by the groove, and the second bulge touches the first bulge so that the second fiber connector can be coupled to the first fiber connector.

14. The robot manipulator of claim 10, wherein the first connecting part and second connecting part both have at least one receiving portion, the first magnetic part and the second magnetic part are received by the corresponding receiving portions.

15. The robot manipulator of claim 10, wherein the first connecting part further comprises at least one second electrical connector, the second connecting part further comprises at least one second conduction connector, the second electrical connector is coupled to the second conduction connector, the second electrical connector has the same structure as the first conduction connector, and the second conduction connector has the same structure as the first electrical connector.

16. The robot manipulator of claim 15, wherein the first fixing member and the second fixing member both further comprise at least one second container, the main body of each first container and each of the second containers have holes passing there-through, the first optical fiber connector is set in the hole of the first container of the first fixing member, the second optical fiber connector is set in the hole of the first container of the second fixing member, the first electrical connector and the second electrical connector are set in the corresponding holes of the second containers of the first fixing member and are coupled onto the second containers of the first fixing member, and the first conduction connector and the second conduction connector are set in the corresponding holes of the second containers of the second fixing member and are coupled onto the second containers of the second fixing member.

17. The robot manipulator of claim 16, wherein the main body of each first container has a hole along a central axis thereof, each of the first containers further comprises two bulges extending from the corresponding main body, each of the tabs has an installation hole, the first optical fiber connector and the second optical fiber connector both comprise a first fixing part, each of the first fixing parts has assembly holes related to the installation holes and positioning holes related to the bulges, and the bulge are configured to be coupled to the related positioning holes.

* * * * *